United States Patent

Morris et al.

(10) Patent No.: US 10,269,352 B2
(45) Date of Patent: Apr. 23, 2019

(54) SYSTEM AND METHOD FOR DETECTING PHONETICALLY SIMILAR IMPOSTER PHRASES

(71) Applicant: NICE Ltd., Ra'anana (IL)

(72) Inventors: Robert William Morris, Decatur, GA (US); Neeraj Singh Verma, Marietta, GA (US)

(73) Assignee: NICE Ltd., Ra'anana (IL)

( * ) Notice: Subject to any disclaimer, the term of this patent is extended or adjusted under 35 U.S.C. 154(b) by 157 days.

(21) Appl. No.: 15/390,026

(22) Filed: Dec. 23, 2016

(65) Prior Publication Data

US 2018/0182378 A1    Jun. 28, 2018

(51) Int. Cl.
*G10L 15/26* (2006.01)
*G06F 16/33* (2019.01)

(52) U.S. Cl.
CPC .......... *G10L 15/26* (2013.01); *G06F 16/3343* (2019.01)

(58) Field of Classification Search
None
See application file for complete search history.

(56) References Cited

U.S. PATENT DOCUMENTS

| | | | |
|---|---|---|---|
| 7,263,484 B1 * | 8/2007 | Cardillo | G10L 13/08 704/236 |
| 9,201,965 B1 * | 12/2015 | Gannu | G06F 16/635 |
| 9,361,879 B2 | 6/2016 | Morris et al. | |
| 2005/0240768 A1 * | 10/2005 | Lemma | G06T 1/005 713/176 |
| 2005/0289463 A1 * | 12/2005 | Wu | G06F 17/2223 715/257 |
| 2006/0217966 A1 * | 9/2006 | Hu | G10L 25/00 704/200 |
| 2007/0096896 A1 * | 5/2007 | Zingelewicz | G08B 21/12 340/522 |
| 2007/0271241 A1 * | 11/2007 | Morris | G10L 15/26 |
| 2008/0270138 A1 * | 10/2008 | Knight | G10L 15/26 704/260 |
| 2009/0024046 A1 * | 1/2009 | Gurman | A61B 7/003 600/529 |
| 2009/0043518 A1 | 2/2009 | Roh et al. | |
| 2009/0043581 A1 * | 2/2009 | Abbott | G10L 15/187 704/254 |
| 2009/0164217 A1 * | 6/2009 | Arrowood | G10L 15/14 704/254 |
| 2010/0179811 A1 * | 7/2010 | Gupta | G10L 15/22 704/235 |
| 2010/0217596 A1 * | 8/2010 | Morris | G10L 15/10 704/251 |

(Continued)

*Primary Examiner* — Thuykhanh Le
(74) *Attorney, Agent, or Firm* — Pearl Cohen Zedek Latzer Baratz LLP

(57) ABSTRACT

A system and method for detecting phonetically similar imposter phrases may include using automatic speech recognition (ASR) to search for a first phrase in a set of objects; producing a list of references by searching for the first phrase in the set of objects using phonetic search; using output produced by the ASR to determine whether or not a reference in the list points to a phrase that is the same as the first phrase; and if it is determined that the reference points to a second phrase that is different from the first phrase then marking the second phrase as a potential cause for a phrase search false positive.

18 Claims, 6 Drawing Sheets

(56) References Cited

U.S. PATENT DOCUMENTS

| | | | |
|---|---|---|---|
| 2010/0274667 A1* | 10/2010 | Lanham | G06Q 30/02 705/14.49 |
| 2010/0298656 A1* | 11/2010 | McCombie | G16H 50/50 600/301 |
| 2012/0116766 A1* | 5/2012 | Wasserblat | G10L 15/08 704/254 |
| 2012/0310926 A1* | 12/2012 | Gannu | G06Q 30/02 707/723 |
| 2013/0253919 A1* | 9/2013 | Gutierrez | G06Q 20/24 704/201 |
| 2014/0012579 A1* | 1/2014 | Ganong, III | G10L 15/01 704/257 |
| 2014/0012580 A1* | 1/2014 | Ganong, III | G10L 15/1815 704/257 |
| 2014/0025379 A1* | 1/2014 | Ganapathiraju | G10L 15/08 704/255 |
| 2014/0188475 A1* | 7/2014 | Lev-Tov | G10L 15/19 704/254 |
| 2014/0207457 A1* | 7/2014 | Biatov | G10L 15/063 704/243 |
| 2014/0222430 A1* | 8/2014 | Rao | G10L 15/04 704/254 |
| 2015/0120289 A1* | 4/2015 | Lev-Tov | G10L 15/01 704/231 |
| 2015/0161989 A1* | 6/2015 | Hsu | G10L 15/08 704/251 |
| 2015/0199961 A1* | 7/2015 | Arkko | G10L 15/22 704/251 |
| 2015/0339390 A1* | 11/2015 | Urdiales Delgado | G10L 25/54 707/711 |
| 2016/0110085 A1* | 4/2016 | Barton | H04L 12/2823 715/736 |
| 2016/0110994 A1* | 4/2016 | Taylor | G08B 29/22 340/514 |
| 2016/0220169 A1* | 8/2016 | Girouard | A61B 5/4094 |
| 2016/0269533 A1* | 9/2016 | Taylor | H04W 4/90 |
| 2016/0269841 A1* | 9/2016 | Shinde | G08B 1/08 |
| 2017/0206776 A1* | 7/2017 | Linder | G08B 1/08 |

* cited by examiner

SYSTEM AND METHOD FOR DETECTING PHONETICALLY SIMILAR IMPOSTER PHRASES

FIELD OF THE INVENTION

The present invention relates generally to detecting phonetically similar imposter phrases. More specifically, the present invention relates to identifying a potential cause for a phrase search false positive by identifying phrases that are phonetically similar to a searched phrase.

BACKGROUND OF THE INVENTION

Searching for documents or other digital objects that contain or include a phrase is known in the art. For example, phonetic queries designed to search, in a database or other storage, for documents that include a phrase are known. A phonetic query may include a set of phrases to be searched for and one or more rules. For example, a phonetic query may include a first phrase to be searched for and a second phrase to be excluded from the search such that the result (or response to the query) includes a list or other reference to documents that include the first phrase and do not include the second phrase. A phrase may be for example one or more words as a group (e.g., "carpenter", "manual laborer", "dye-free detergent"), and a phrase typically has a meaning if a group of words (e.g. "Olympic opening ceremonies").

Phonetically similar phrases are a major challenge for the industry. For example, phonetically similar phrases are the primary cause of false alarms in known system and methods, e.g., search engines that use phonetic queries. For example, if a user wants to find documents with the phrase "computer" the user might get false alarms or results, e.g., since the phrase "commuter" may be wrongly identified as the searched for "computer" phrase.

SUMMARY OF THE INVENTION

An embodiment for identifying potential cause for a phrase search false positive (e.g. an indication of a match which is incorrect as there is no match) may include using automatic speech recognition (ASR) to search for a first phrase in a set of digital objects (e.g., files, text documents, audio files, or other digital media stored as described herein); producing a list of references by searching for the first phrase in the set of objects using phonetic search; using output produced by the ASR to determine whether or not a reference in the list points to a phrase that is the same as the first phrase; and if it is determined that the reference points to a second phrase that is different from the first phrase then marking the second phrase as a potential cause for a phrase search false positive.

A list of phrases generated by some embodiments may include, for each phrase, an identification of an object that includes the phrase, an offset or location of the phrase in the object and a length of the phrase, a marking the second phrase as a potential cause for a phrase search false positive includes at least one of: verifying a reference to the phrase in the list and a reference to a phrase identified by the ASR are related to, or reference or point to, the same object, and verifying, based on an offset and a time length in the list, that an overlap of a phrase referenced in the list with a phrase identified by the ASR is equal to, or above a threshold. The list may include for example, for each referenced phrase, a confidence score value and the second phrase being marked as a potential cause for a phrase search false positive the confidence score value is equal to, or above a threshold.

In one embodiment if the confidence score value of the second phrase is equal to, or above a threshold then the second phrase may be included in a set of confusable phrases and use the set of confusable phrases to generate an operator designed to cause a query for searching the first phrase to omit the set of confusable phrases from a response of the query. If the number of references in the list is below a predefined value then an embodiment may set the value of the threshold to a predefined threshold value and if the number of references in the list is equal to, or above the predefined value then an embodiment may set the value of the threshold based on the lowest confidence score value.

An embodiment may use the second phrase to generate an operator designed to cause a query for searching the first phrase to omit the second phrase from a response of the query. An embodiment may remove a phrase from the set of confusable phrases based on a match level of the phrase with the first phrase. An embodiment may remove a phrase from the set of confusable phrases based at least one of: the number of references to the phrase in the list of references and a presence of stop words in the phrase.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
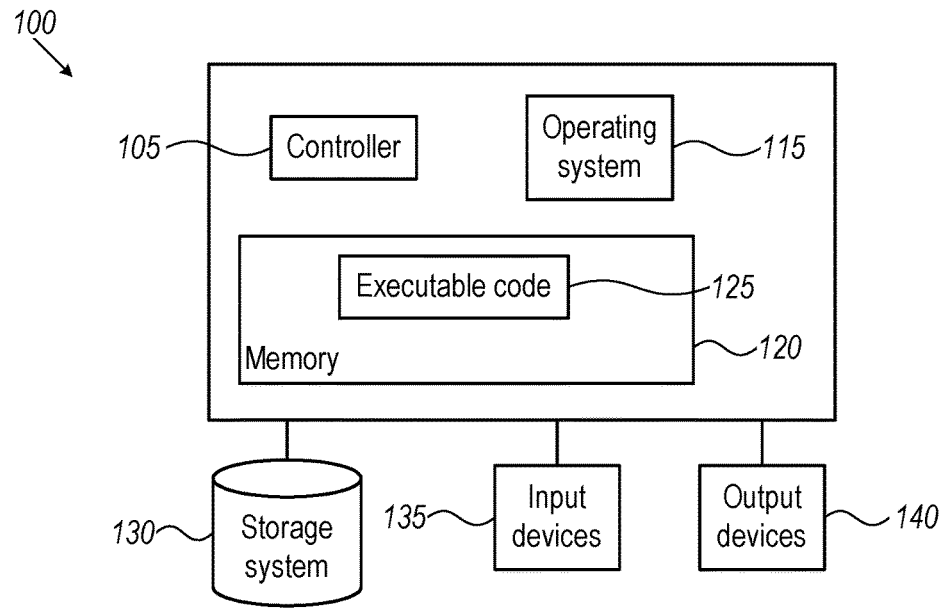
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to some embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that identifies potential causes for a phrase search false positive as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
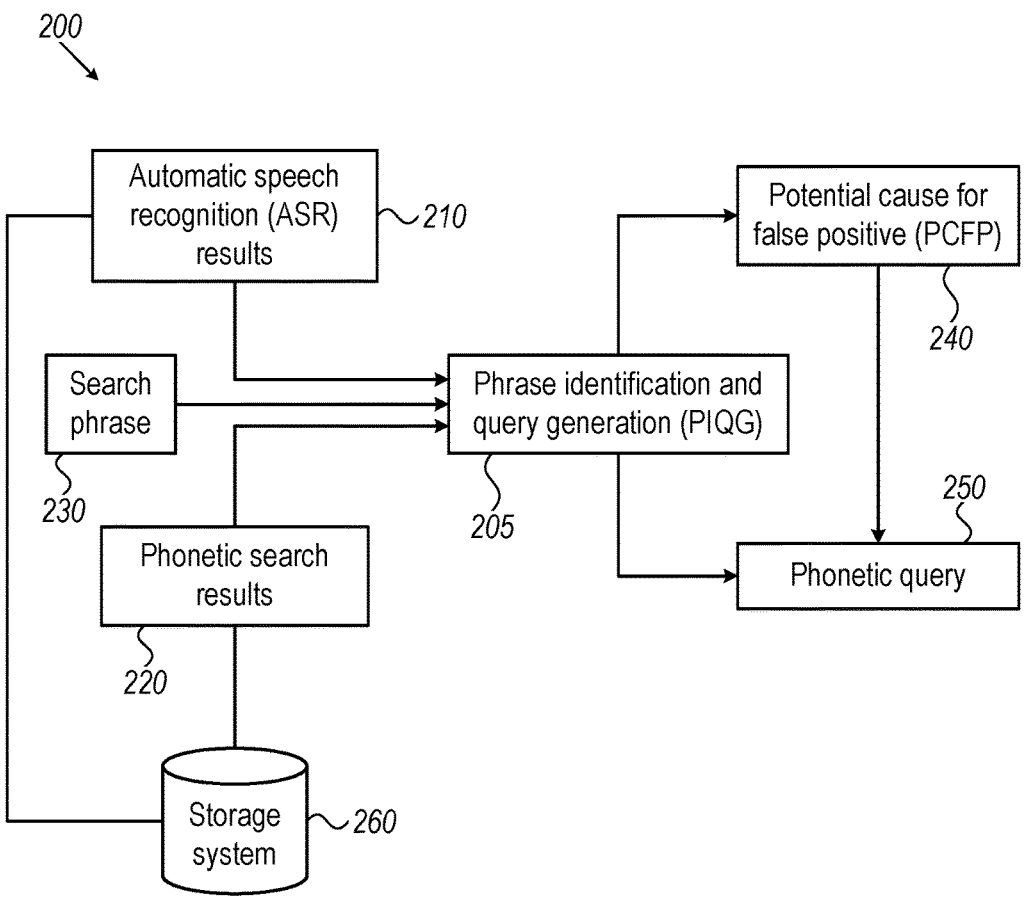
FIG. 2 is an overview of a system according to illustrative embodiments of the present invention.

Reference is made to FIG. 2, an overview of a system 200 and flows according to some embodiments of the present invention. As shown, a system may include a phrase detection and query generation (PIQG) unit 205 that may receive as input a search phrase 230, automatic speech recognition (ASR) results 210 and phonetic search results 220 and produce potential causes for false positives (PCFP) 240 and/or produce or provide a phonetic query 250.

System 200 or components of system 200 may include components such as those shown in FIG. 1. For example, PIQG unit 205 may be, or may include components of, computing device 100, e.g., PIQG unit 205 may include a controller 105, a memory 120 and executable code 125.

As shown, system 200 may include, or may be operatively connected to, a storage system 260. For example, interactions may be stored on storage system 260 and ASR results 210 and phonetic search results 220 may be produced by searching for phrases in interactions stored in storage system 260. Storage system 260 may be any suitable storage system, e.g., a persistent storage system as known in the art such as a hard disk or drive, database etc.

Search phrase 230 may be any phrase that a user or application is searching for. For example, search phrase 230 may be a word, e.g., "dog" or it may be a phrase, e.g., "a brown dog". Typically, search phrase 230 is provided to an embodiment as input, e.g., when a user or application wants to search for a phrase in interactions in storage system 260, e.g., find all the interactions that include the phrase, the user or application provides the phrase as search phrase 230 to an embodiment.

As described and shown by PCFP 240, based on a provided an input search phrase 230, an embodiment may return a set of phrases that may cause search false positives with respect to input search phrase 230. False positive as known in the art (and referred to herein) may relate to a search result that incorrectly indicates that a specific phrase was found in an object. Generally, objects in which phrases are searched for and/or found, e.g., using ASR or phonetic search as described herein, may be any digital content stored in storage system 260, e.g., recorded interactions as described herein. For example, finding the word "commuter" when searching for the word "computer" may be a case, or cause for, a false positive, Accordingly, with respect to a search phrase 230 that is "computer", PCFP 240 may include "commuter".

As described and shown by phonetic query 250, based on a provided input search phrase 230, an embodiment may generate, provide, return and/or execute a search query. For example, when requested to search for the word "computer" in a set of documents, known systems and methods may wrongly provide or return, e.g., in response to a query, documents that include words such as "commuter", embodiments of the invention may solve such false positives.

For example, using an input phrase 230 of "computer" and PCFP 240 generated for the phrase, an embodiment may generate, provide or execute a query that will return, list, or indicate, documents or interactions that include the word "computer" and documents that include the word "com-muter" may be excluded from the list such that a false positive of finding "commuter" when searching for "computer" is avoided.

ASR can generally be described as a technique for producing readable text from spoken language. For example, ASR enables a computer to identify words spoken, by a human, into a microphone. ASR results 210 may be any data produced by an ASR system or method as known in the art. For example, ASR results 210 may include, with respect to a search phrase 230, a file or object identification (e.g., a name of a file that includes the phrase), an offset that indicates where in a file the search phrase 230 is found, a length of a phrase found in the file. The offset may be in units such as time, e.g., representing by a start time of the phrase in, or relative to the start of the file, but may be other units, e.g., the number of bits or bytes into the file from the start (e.g., offset), etc. Methods of locating a phrase other than time or offset may be used. A length may be, e.g., represented by a time interval and/or a start and an end time in the file, but other methods may be used.

Phonetic search results 220 may be any data produced by phonetic search system or method as known in the art. For example, phonetic search results 220 may include a file or object identification, an offset and a length of a phrase found in the file using phonetic search.

Generally, phonetic search as known in the art and referred to herein may include breaking down an audio signal of captured human speech into phonemes, and the set of phonemes may be used to identify words. ASR as known in the art and referred to herein may include encoding recorded speech (e.g., into a waveform or set of vectors) and using encoded speech to decode the speech into words or sentences, for example in text or computer readable form. While readable text may, if interpreted properly, allow phonemes to be extracted, phonetic search focusses on the phonemes and identifies phonemes as phonemes, as opposed to readable text, which requires interpretation (e.g., by a reader) to extract phonemes, as a typical language does not always have a simple correspondence between its written form and the phonemes in its spoken form.

In some embodiments, phonetic search results 220 may include, for each phrase found using phonetic search, a score or a confidence level. Any system or method for assigning a confidence level or score to phonetic search results may be used. For example, a confidence level or score may be calculated as the likelihood ratio that a phoneme sequence determined from a phrase occurred compared to a predefined phonetic grammar.

Search phrase 230 may be any term, word or phrase, e.g., search phrase 230 may be any term, word or phrase a user wants to search for in a set of interactions, e.g., interactions stored in storage system 260. An interaction as referred to herein may be, for example, a conversational exchange between one or more people, e.g. a verbal conversation, a conversation via e-mail, or a conversation via text or other messages. An interaction may be for example customer media as known in the art, e.g., a recorded conversation or a transcription of a recorded conversation. For example, interactions may be recorded, e.g., by audio recording as known in the art, recordings of text, etc. as known in the art. Recorded interactions may be transcribed such that a textual representation of interactions is produced. For example, a transcription of a recording of a conversation between an agent and a customer may enable searching for words or phrases mentioned in the conversation. For example, using ASR, transcriptions of interactions may be produced and stored, e.g., in storage system 260. For the sake of simplicity, "recorded interactions" and "transcriptions of interactions" may be referred to herein as interactions, e.g., searching for a phrase in transcriptions of recorded interactions may be simply described (or referred to) herein as searching for a phrase in interactions.

In some embodiments, PIQG unit 205 may produce ASR results 210 and/or phonetic search results 220. For example, PIQG unit 205 may be, or may include components of, computing device 100 (e.g., a controller 105, a memory 120 and executable code 125) and PIQG unit 205 may examine or process interactions in storage system 260 to produce ASR results 210 and/or phonetic search results 220. In some embodiments, ASR results 210 and/or phonetic search results 220 may be generated by another unit or system and provided to PIQG unit 205.

For example, storage system 260 may include or store files or other objects that include textual representations of interactions (e.g., transcriptions of recorded interactions) produced by performing ASR operations on recorded audio interactions as known in the art. For example, after a conversation between am agent and a customer is recorded, e.g., by storing digital audio signals or other multimedia content in files on storage 260, an ASR engine may process the stored content, produce textual representation of the content, e.g., a transcription, and store the textual representation in storage 260. An ASR engine may further produce ASR results (e.g., ASR results 210) as described herein. Phonetic search as described herein may be done on transcriptions as known in the art.

Potential cause for a phrase search false positive (PCFP) 240 may be, or may include, one or more phrases that may be phonetically similar, or close to, search phrase 230. For example, if search phrase 230 is "computer" then PCFP 240 may include phrases such as "commuter", "complicate" and the like. Some phrases may be phonetically similar, or close to, search phrase 230 (e.g., "computers") and may be marked as acceptable alternatives, e.g., by a stemmer unit in PIQG 205, and may not be included in a list of phrases that may cause phrase search false positives as described.

Phonetic query 250 may be for example a search query that includes search instructions, e.g., a query sent to a search engine as known in the art. For example, an agent in a contact center may want to search for the phrase "I bought a car" in calls (e.g., interactions) made to the contact center in the last week. To do so, the agent may use a phonetic query sent to a database where the query indicates the phrase of interest ("I bought a car") and a time frame (last week). Typically, a response to the query includes names, references or pointers to interaction that include the phrase of interest, e.g., calls in which a caller said "I bought a car". However, as described, a response to a query may include false positives, e.g., in the above example, a response may include reference to an interaction that includes the phrase "I brought some tar". As described herein, embodiments of the invention may address the challenge of phonetic search false positives by automatically generating queries such that false positives are excluded from responses to the queries.

In some embodiments, phonetic query 250 may specify terms, phrases or words to be excluded from a search or from search results. For example, phonetic query 250 may specify a word to be searched by a search engine (e.g., search for "computer") and may further specify or indicate words or terms to be excluded from the search and/or results (e.g., exclude from the search or search results the terms "commuter" and "complicate"). For example and as shown by the arrow connecting blocks 240 and 250, PIQG may use data in PCFP 240 to generate phonetic query 250 such that terms or phrases in PCFP 240 are excluded from a search performed based on phonetic query 250.

In some embodiments, a NOTLIKE operator or primitive may be included in a query. For example, using query language as known in the art, a NOTLIKE operator or primitive may indicate a word or phrase to be searched for and one or more words or phrases to be excluded from the search. For example, if a user wants to find files, documents or interactions that include the word "confirmation" but does not want a result from a search query to include files, documents or interactions that include the word "information" then a NOTLIKE ("confirmation", "information") operator may be used. It will be understood that the NOTLIKE operator or primitive is presented herein for the sake of clarity and simplicity and that any query language may be used, e.g., to generate phonetic query 250, such that when using phonetic query 250 to search for a term or phrase, a set of one or more phrases or terms to be excluded from the search are specified in phonetic query 250.

In some embodiments, an ASR may be applied to, or executed on, a set of interactions or customer media, e.g., ASR may be used to identify and record phrases, words or terms in interactions stored in storage system 260. A phonetic search may be used to find words or phrases in the same set of interactions or customer media. Treating the ASR search results as correct and the phonetic search as putative hits, an embodiment may identify or mark a set of phrases or words (e.g., some of the putative hits) as potential causes for false positives.

Marking a phrase or word as potential cause for false positive may include inserting the phrase into a list of phases, setting a pointer to the phrase in a list of pointers, modifying a table or creating any data that enables an embodiment (e.g., PIQG 205) to locate the phrase and/or know, determine or identify that the phrase is a potential causes for false positive. As described herein, a set of marked phrases may be used in various ways, for example, phrases marked as potential causes for false positives may be included in an operator as described. Accordingly, a marking of phrases may be used for generating operators and queries. Information presented or provided to a user may be modified based on marked phrases. For example, a list of interactions presented to a user may exclude interactions that include marked phrases. Some operations may be based on marking phrases. For example, the operation of generating an operator may be based on marking of phrases, e.g., marked phrases may be included in operators as described.

Figure 3:
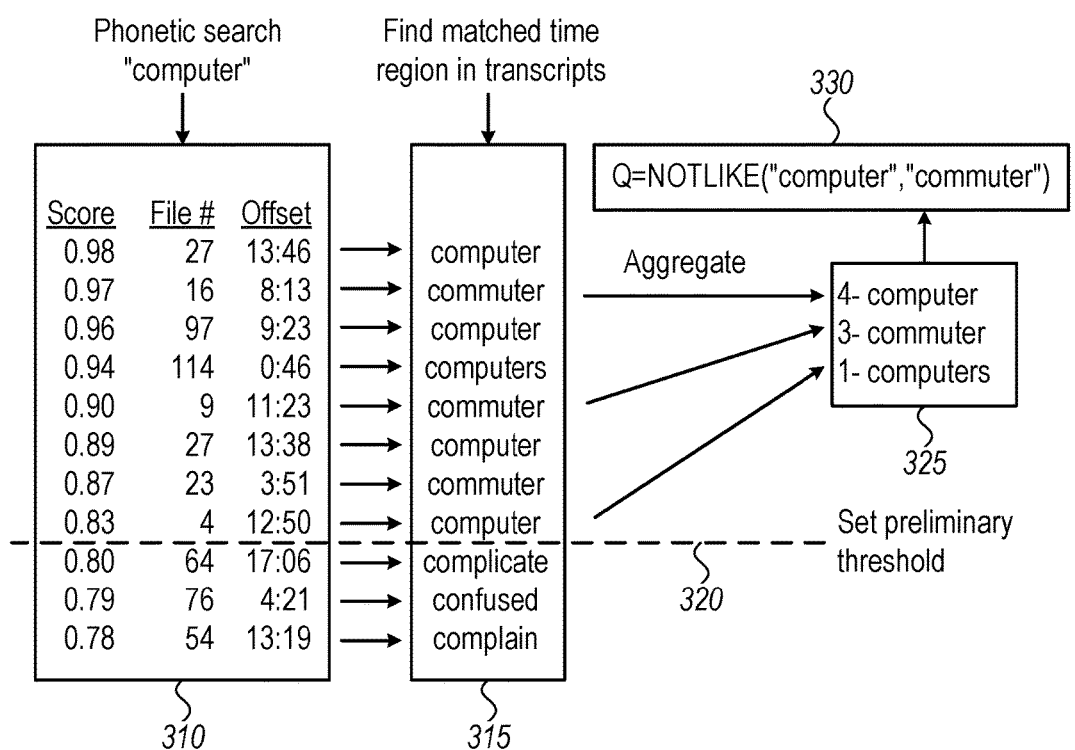
FIG. 3 graphically illustrates generation of a query according to illustrative embodiments of the present invention.

Reference is made to FIG. 3 which graphically illustrates generation of a query according to illustrative embodiments of the present invention. As shown by block 310, a phonetic search for a search phrase 230 (in this case for "computer") may produce a set of putative hits. Results received from a phonetic search, e.g., phonetic search results 220, may be referred to herein as "putative results" or "hits".

As shown by block 310, each hit in the phonetic search includes a file identification that indicates the file in which the phrase was found and an offset that indicates where in the file the phrase was found. As shown by block 315, the results of the phonetic search may be matched, compared or otherwise related to phrases or words identified, in the same files and offsets, using ASR. For example and as shown, the word "computer" was found, by a phonetic search and by an ASR search, in file "27" at offset 13:46, however, the word "computer" was additionally found, by the phonetic search, in file "64" at offset 17:06 but the ASR search found, at the same file and offset (in file "64" at offset 17:06), the word "complicated".

As shown by threshold 320, words or phrases found by a phonetic search and assigned, or associated with, a score lower than a threshold (e.g., a score lower than 81) may be excluded from, or ignored in, further processing. As shown by block 325, a group or list of words or phrases that includes words and phrases produced by the ASR search may be created wherein the list is created or generated based on the threshold. For example, the word "computers" may be included in the list shown by block 325 since the phonetic score for this word is 0.94 which is higher than a threshold of 0.8 but the word "complain" may be excluded from the list since its phonetic score is 0.78 which is lower than the threshold of 0.8.

As shown by block 330, a search query that includes a NOTLIKE operator may be generated such that the query may search for the word "computer" and further exclude from a search (or from a result or response) the word "commuter".

Any number of potential causes for false positives may be included in NOTLIKE operator. For example and as shown by block 325, given a search phrase 230 that is "computer", an embodiment may identify the words "commuter" and "computers" as potential causes for false positives and may automatically generate a query that will search for the word "computer" but exclude from the search the words "commuter" and "computers", e.g., using a NOTLIKE operator that includes a search phrase and a set of potential causes for false positives, e.g., NOTLIKE ("computer", "commuter", "computers").

Figure 4A:
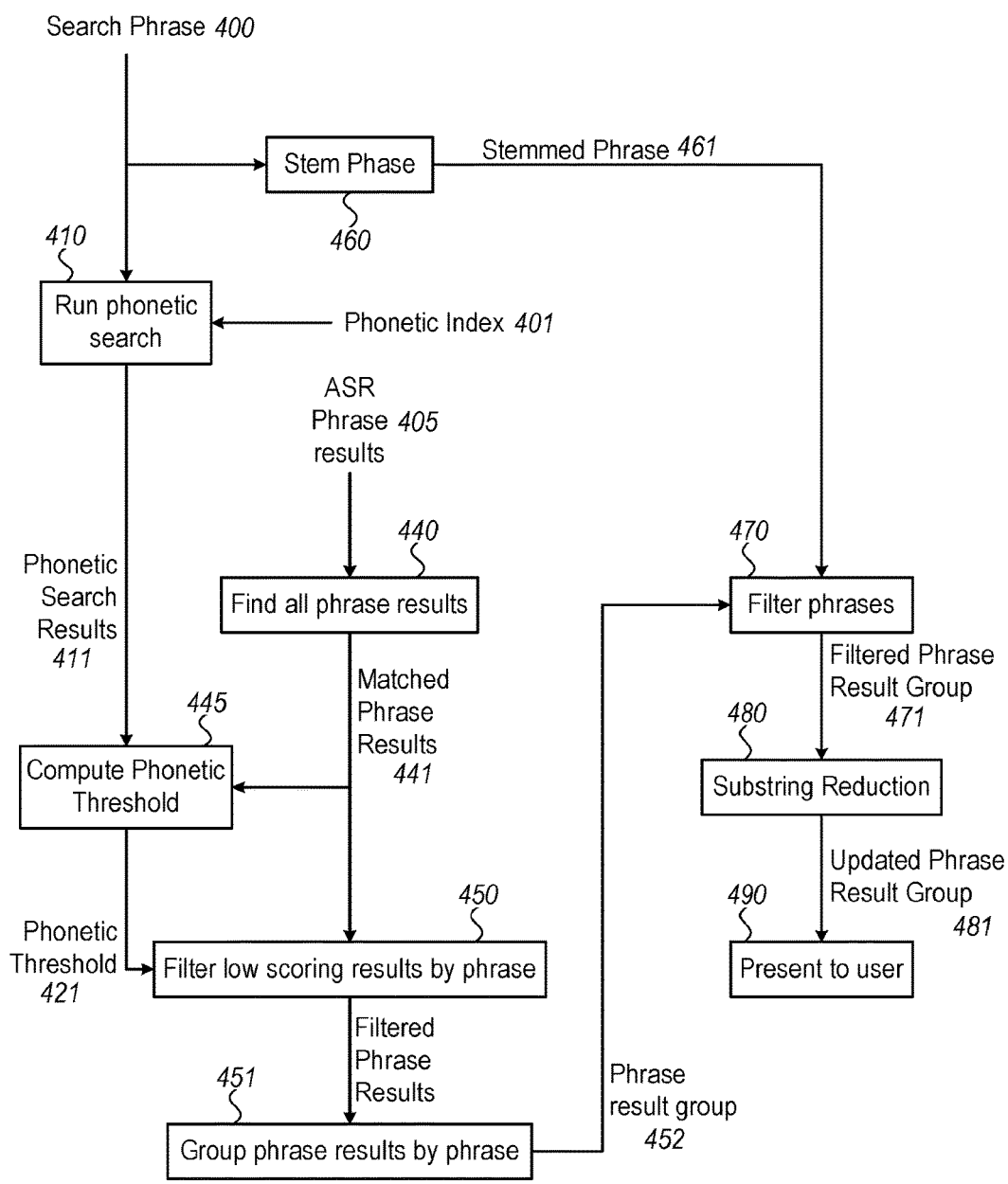
FIG. 4A shows a flowchart of a method according to illustrative embodiments of the present invention.

Reference is made to FIG. 4A, a flowchart of a method according to illustrative embodiments of the present invention. As shown by step 400, a search phrase may be received, e.g., search phrase 230 may be entered by or received from a user. As shown by step 410, a phonetic search for the phrase may be done e.g., using phonetic index 401. The phonetic search may produce phonetic search result 411 that may be a list of putative phonetic hits as described.

Figure 4B:
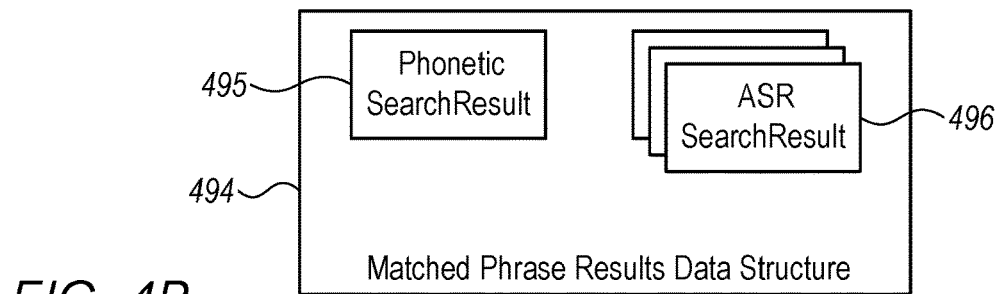
FIG. 4B that shows an example of a data structure according to illustrative embodiments of the present invention.

As shown by block 440, the phonetic search results may be matched, or associated with, ASR phrase results 405 such that matched phrase results 441 is created. Matched phrase results 441 may include, for each phrase found by the phonetic search, a set of ASR search results that match the file and time of the phonetic search. For example, if the phonetic search as shown by step 410 found the word "computer" in a file named "file-name.ext" at time or offset 13:20 then, if the ASR phrase results 405 includes a hit or indication that the word "computer" was found in file-name.ext around the time or offset of 13:20 then the result of the ASR search is associated with the result of the phonetic search, e.g., an entry in matched phrase results 441 includes the phonetic result and the ASR result such that the two are associated or linked. Reference is additionally made to FIG. 4B that shows an example of a matched phrase result data structure. As shown, a data structure 494 may include a phonetic search result 495 (that may be as described herein) and a set of ASR search results 496 that may be associated with, or linked to, phonetic search result 495.

In some embodiments, a number or set of ASR results may be matched, associated or linked with a single phonetic result. For example, a unit (e.g., an ASR engine) that produces ASR results 210 can find multiple phrases when multi-word sequences are found. For example, if "can put your" was found, and included in a putative hit (e.g., in phonetic search results 220) of "computer", then PIQG 205 may include the phrases "can put your", "can put", and "put your" in PCFP 240 thus, with respect to a single phonetic result, treating a set of ASR results as confusable terms, phonetically similar imposter phrases or potential cause for false positives.

For example, for each phonetic search result, every ASR search result that matches in time is included. An ASR search result may be considered a temporal match if the two results (the ASR result and the phonetic result) have the same file identification (ID), e.g., the two results are related to, or reference or point to, the same file name and/or location or any other identification of a file or object in storage system 260.

As described, in some embodiments, a phrase identified or considered as a temporal match may be removed or excluded from a list or set of confusable terms (or phonetically similar imposter phrases or potential cause for false positives) based on a match level of, or between, a phrase identified using ASR and a phrase found or identified using phonetic search.

An ASR search result may be considered a temporal match if the phonetic result's start time is less than the ASR results end time, and the phonetic result's end time is equal to, or greater than the ASR result's start time. A start and time as referred to herein may be an offset in a file, e.g., the file may be a recording of an interaction starting at time "0" and data in the file may be referenced using time that is equivalent to offset or location in the file, accordingly, to verify a match, e.g., verify that the word "computer" found using ASR is related a word found using phonetic search, the times and length (that may be expressed in offset and start and end times) of the words may be compared, checked or otherwise related as described.

An overlap as described herein may describe, or be related to the case where a portion of a first phrase is the same as a portion of a second phrase. For example, an overlap may be identified with respect to the phrases "I took a fork" and "He took a walk" since the portion of "took a" is same in both phrases. An overlap may be characterized for example using time or offset. For example, as described, the start time and offset of phrases in a file may be known, accordingly, an overlap may be expressed using time and/or offsets.

In some embodiments, a time overlap threshold may be used when selecting phrases for automatic query generation. For example, to select phrases that will be included in a list of potential cause for a phrase search false positive, a time overlap threshold may be used such that phrases found by an ASR are selected only if they overlap with respective phrases found by a phonetic search by more than a threshold as described.

For example, a threshold may be used such that a phrase found using ASR is included in a list only if it overlaps, in time and by a predefined level or magnitude, a respective phrase found by a phonetic search. For example, in some embodiments, a measure of time overlap may be achieved using Formula 1 (as with all example formulas used herein, other formulas may be used):

$$2*T_{overlap}/(T_{phonetic\_window}+T_{ASRPhrase}) \qquad \text{Formula 1}$$

where $T_{overlap}$ is the time length or amount of overlap of a phrase found by the ASR search and a phrase found by the phonetic search, $T_{phonetic\_window}$ is the length (e.g., expressed in time) of the phrase found by the phonetic search and $T_{ASRPhrase}$ is the length of the phrase found by the ASR search.

For example, if the phrase found by the phonetic search is from 1:00 to 3:00 in time units, e.g. one minute zero seconds to three minutes zero seconds (thus having a length of 2) and the phrase found by ASR search is from 2:00 to 3:00 (thus having a length of 1) then formula 1 above may produce 2*1/(2+1)=0.66. Any value of a time overlap threshold may be set or chosen, for example, a time overlap threshold may be set to 0.6 (or 60%) and only phrases that yield a value equal to, or greater than 0.6 using Formula 1 may be included in a list of potential cause for a phrase search false positive as described herein.

In some embodiments, phrases may be included in a list of potential cause for a phrase search false positive based on a score or confidence level, e.g., based a score determined for, or assigned to, phonetic search results as described herein, e.g., as shown in block 310 in FIG. 3. In some embodiments, a phonetic threshold may be calculated and phrases found by a phonetic search with a score or confidence level that is below the phonetic threshold may be excluded from a list of potential cause for a phrase search false positive.

For example, as shown by block 445, a phonetic threshold 421 may be calculated or determined and the phonetic threshold 421 may be used to filter out or exclude phrases with a score that is lower than phonetic threshold 421. For example, phrases included in matched phrases 441 may be filtered, e.g., removed from matched phrases 441 as shown by block 450 to produce filtered phrase results.

Figure 5:
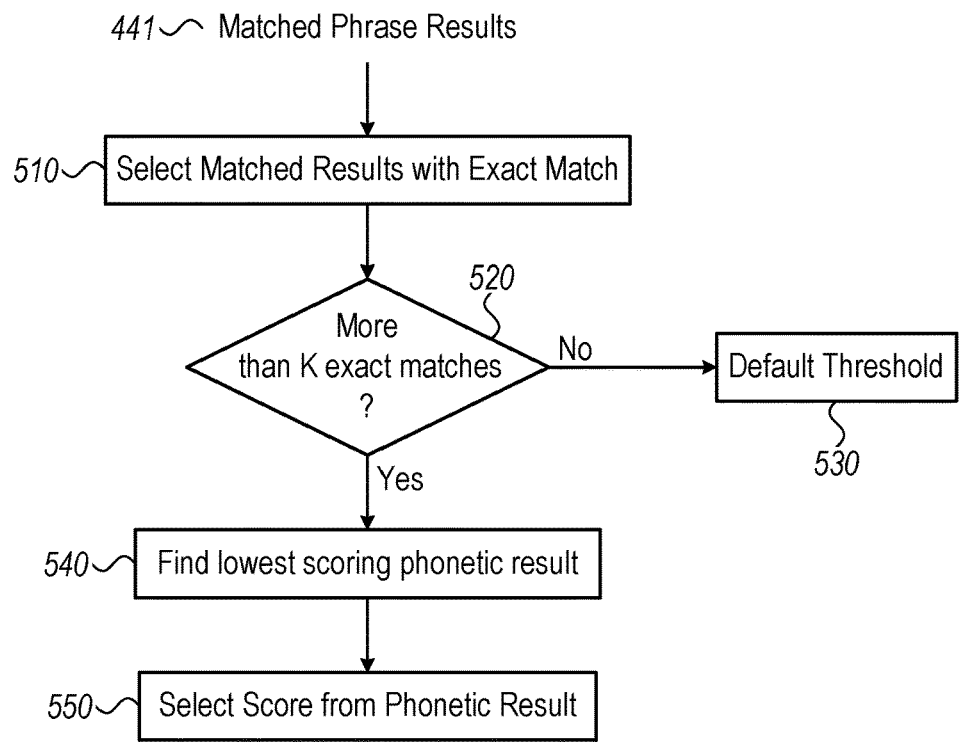
FIG. 5 shows a flowchart of a method according to illustrative embodiments of the present invention.

Reference is additionally made to FIG. 5, a flowchart of a method according to illustrative embodiments of the present invention. The flow shown in FIG. 5 and described herein may be used to generate, create or define a phonetic threshold, e.g., as shown by block 445.

As shown by block 510, matched filtered results may be filtered to only include phonetic search results that include exact ASR matches. For example, only results that, using Formula 1, produce a value of 1 (or 100%) may be selected. Accordingly, possibly as a first or initial step, only phrases that were found by the ASR and by the phonetic search at the same time, same file and with the exact same length may be included in a list. As shown by block 520, the number of phrases with an exact match may be checked and compared to a threshold K. For example, threshold K may be 5. As shown by block 530, if the number of phrases is not equal to, or greater than a threshold (e.g., K as described) then a default or predefined phonetic score threshold may be selected, e.g., 0.8.

As shown by block 540, if there are more than K phrases with an exact match then the lowest phonetic score associated with a phrase that has an exact match with the ASR results may be identified (e.g., 0.83 in block 310 of FIG. 3), and, as shown by block 550, a threshold phonetic score may be selected (e.g., 0.83). Any other method or logic may be used to set the threshold if more than K phrases with an exact match are found.

Returning to FIG. 4A, the threshold phonetic score calculated as described herein may be used to filter out the low phonetic scores (as shown by block 450) such that phrases that are not relevant to the actual searches are removed and filtered phrase results are produced.

Figure 4C:
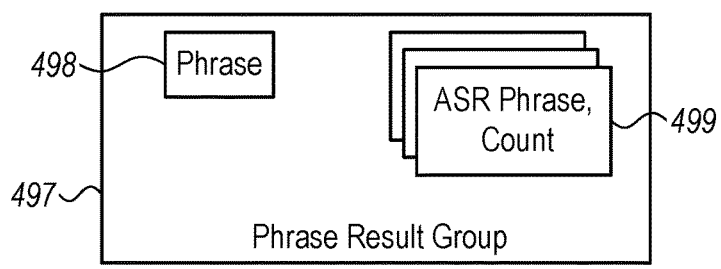
FIG. 4C that shows an example of a data structure according to illustrative embodiments of the present invention.

As shown by block 451, filtered phrase results may be aggregated or grouped by phrases into phrase result groups or lists of phrases to produce phrase result groups (452). Reference is additionally made to FIG. 4C that shows an example of a phrase result group data structure. As shown, a data structure 497 may include phrase 498 and a set of ASR phrase and their respective count (or occurrences) 499 that may be associated with, or linked to, phrase 498. For example, for each phrase 499 found using ASR, the number of times the phrases were found (also referred to herein as the number of occurrences) is recorded in the count of the ASR phrase as shown by block 499.

As shown by block 460, the search phrase (e.g., search phrase 230 provided by a user) may be stemmed, e.g., by removing stop words (e.g. "a", "the" and "my"), and stemming the remaining phrases to produce stemmed phrase 461. Phrase result groups 452 may be filtered as shown by block 470, based on a stemmed phrase 461 and using a variety of criteria.

For example, filtering of phrases as shown by block 470 may include leaving in a list only phrases that: have only one occurrence (or appear only once) in the ASR results (e.g., in ASR results 210) and/or are not a superstring of the search phrase 400 and/or are not a compatible overlap, where compatible overlap describes a situations where the last words of one phrase match the first words of the second phrase, e.g., in the case of "computer system" and "system password".

Filtering of phrases as shown by block 470 may include leaving in a list only phrases that: include more than a threshold portion of search phrase 400 (e.g., include at least 70% of the characters in search phrase 230), do not start or end with stop words and/or have a number of matches that is more than 1% of the phonetic matches. For example, PIQG 205 may filter out, or remove from a list of potential causes for false positives a phrase, if the total count of ASR results for the phrase is less than 1% of the total count of putative phonetic results that are associated with a score that is equal to, or above a threshold. As shown, filtering phrases as shown by block 470 may produce filtered phrase result group 471.

As shown by block 480, an embodiment may replace sub-strings with strings. For example, if "commuter rail" is 90% of the occurrences of "commuter", then an embodiment may replace "commuter" with "commuter rail" in updated phrase result group 481. e.g., since "commuter rail" is phonetically stronger than "commuter" in this case. Accordingly, an embodiment may emphasize or prefer common longer phrases when they form the majority of the causes for false alarms.

Substring reduction as shown by block 480 may include, taking the phrase of each result group (e.g., phrase 498 as shown in FIG. 4C) and searching for substrings of the phrase in the group (e.g., in ASR phrases 499).

Figure 7:
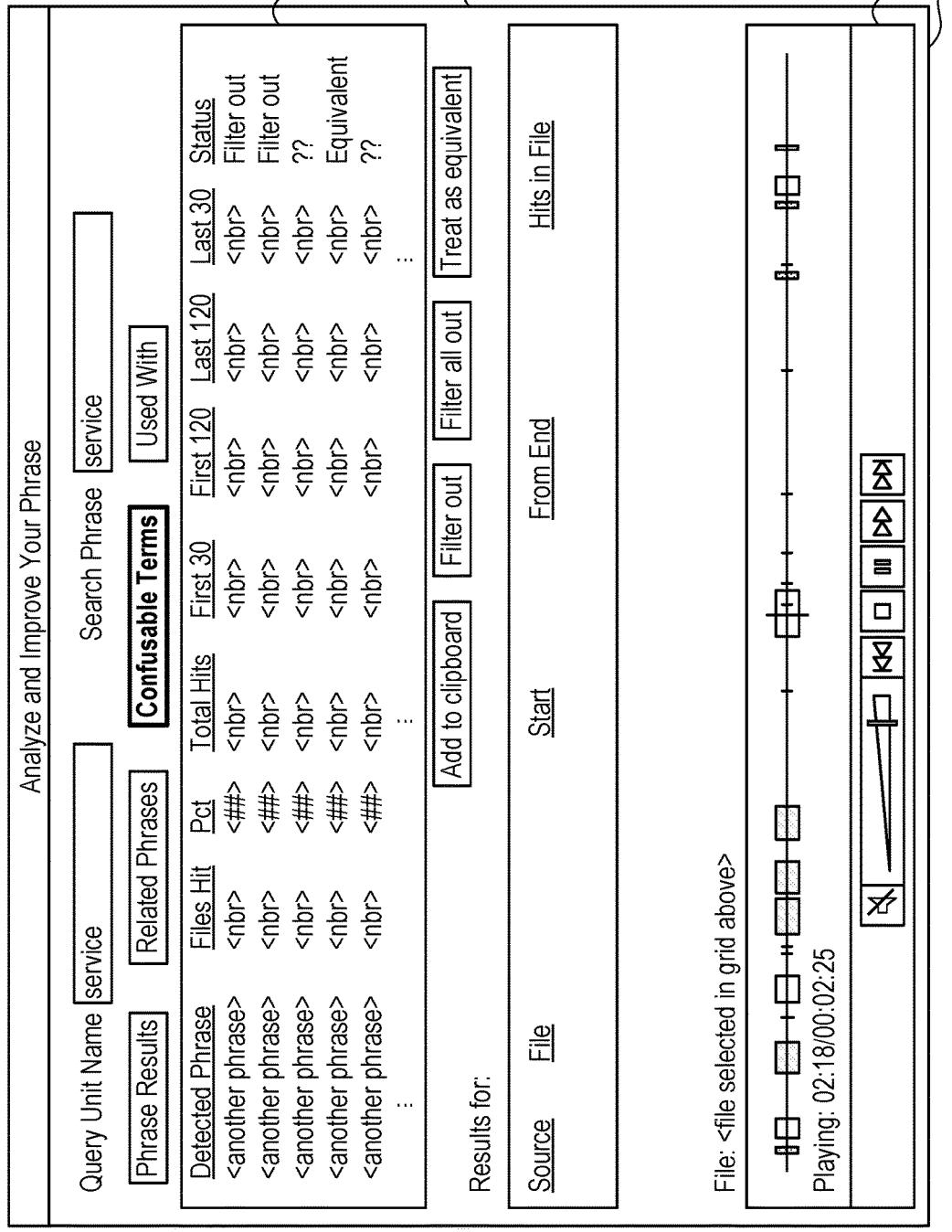
FIG. 7 shows an example of presentation of information to a user according to illustrative embodiments of the present invention.

Various rules may be used to replace a substring with a string. For example, in some embodiments, if a substring occurs, or is found less than twice as often as the (longer or containing) phrase, the substring's score is discounted by the count of the longer or including phrase or string. For example, if "commuter rail" (the containing or longer phrase) occurred 90 times, and "commuter" (the substring) occurred 100 times, then the count for "commuter" may be discounted from 100 to 10. Accordingly, in this example, "commuter rail" may be presented to a user first, e.g., before or even instead of "commuter". For example, updated phrase result group 481 may be a list of phrases and a longer or containing string (e.g., "commuter rail") may be placed, in the list, higher than a substring (e.g., "commuter") in the list such that the longer or containing string is presented, to a user, before the substring. Accordingly, an embodiment may emphasize or prefer longer phrases, e.g., present to a user "commuter rail" and after, or below "commuter rail", present or suggest (e.g., as shown in FIG. 7) "commuter" that it is phonetically weaker than "commuter rail".

As shown by block 490, updated phrase result group 481 may be presented to a user. For example, phrases may be displayed as text or they may be played to a user, e.g., a recording of a phrase may be played by a media player or a text to speech (TTS) system or method may be used to provide phrases audibly.

Figure 6:
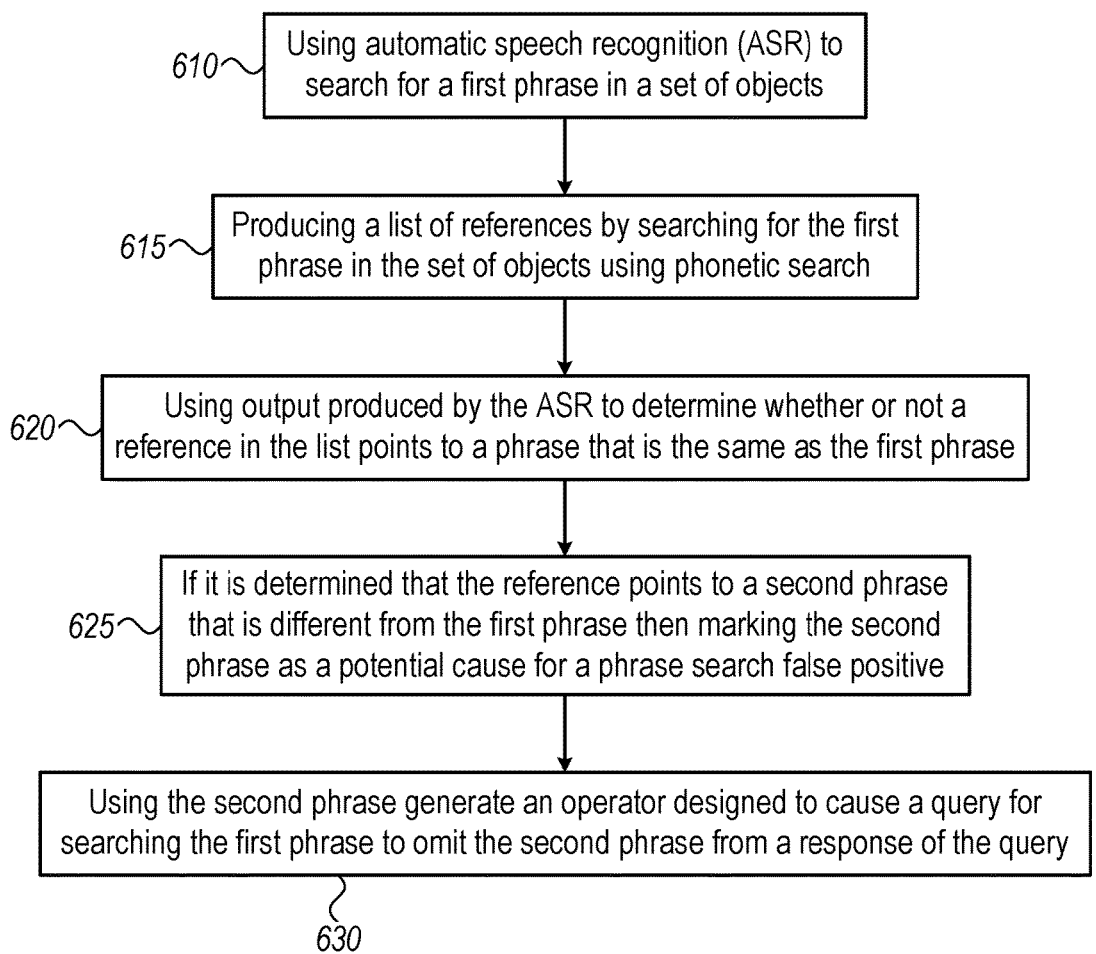
FIG. 6 shows a flowchart of a method according to illustrative embodiments of the present invention.

Reference is made to FIG. 6, a flowchart of a method according to illustrative embodiments of the present invention. As described herein, a phonetic search for a phrase or word may produce results that include similar words or phrases, e.g., phrases that sound like the word or phrase. For example, phonetically searching for "appointment" in data (e.g., in interactions as described) may result a set of putative hits that includes "apartment", "department" and the like. The set of putative hits may be scored and matched to ASR results. The phrases resulting from high-scoring phonetic matches may be aggregated to produce a list of phrases and phrases in this list may be flagged based on whether or not they are the same as the original search term. Phrases that are not equivalent to (or same as) the original search phrase may be included in an operator (e.g., a NOTLIKE operator) that may be included in a search query.

In some embodiments, before searches for phrases are executed as described, a phonetic index may be created on an entire body of media, e.g., on a set of interactions stored in storage system 260. Searching for phrases in a body of media may be done using, or based on a phonetic index. Generally, indexing media may be used to improve retrieval of content, e.g., using vocabulary recognition or other techniques that enable indexing media according to content, e.g., indexing interactions in storage system 260 according to, or based on, phrases in the interactions.

As shown by block 610, ASR may be used to search for a first phrase in a set of objects and produce ASR results. For example, a search phrase as shown by block 230 in FIG. 2 may be searched for, e.g., in a set of recorded interaction stored in storage system 260, using ASR as described. For example, results produced by an ASR search may include, for a specific phrase, a file number or other identification, a start time and an end time of the phrase, in the file.

As shown by block 615, in some embodiments, a list of references may be produced by searching for the first phrase in the set of objects using phonetic search. For example, results produced using phonetic search may include, for a specific phrase, a file number or other identification, a start time and an end time of the phrase, in the file, and a confidence score.

As shown by block 620, the output produced by the ASR search may be used to determine whether or not a reference in the list (produced by the phonetic search) points to a phrase that is the same as the first phrase. For example, a reference in the list may be an entry, field or other element in a list that references, or points to, or otherwise includes data usable for locating a phrase in a file. For example, a reference to a phrase may include a name of a file and an offset in the file where the phrase can be found. A reference in the list may be a pointer as known in the art. For example, a reference in the list may include an address of a file and an offset in the file, e.g., in the form of one or more 32 or 64 bit long objects.

Accordingly, ASR results may be used to verify phonetic search results. If the reference or entry in the list produced by the phonetic search points to a phrase that is same as the first phrase then an embodiment may examine an additional or next entry in the list of phrases, e.g., such that each or all the phrases in the list are examined as described.

As shown by block 625, if it is determined that the reference in the list produced by the phonetic search points to a second phrase that is different from the first phrase then the second phrase may be marked or flagged as a potential or possible cause for a phrase search false positive. For example, if the first phrase is "invoice" and the phrase referenced by the list produced by the phonetic search points to "voicemail" then the phrase "voicemail" may be flagged or marked, and, as further described herein, included in a list of potential causes for a phrase search false positive. Accordingly, by matching phonetic search results with ASR results, an embodiment may identify causes for a phrase search false positive.

As shown by block 630, an operator designed to cause a query for searching the first phrase to omit the second phrase from a response of the query may be generated based on, or using, the second phrase. An operator may be, or may include, logic and/or instructions that may be used by a search engine or other entity that receives and processes a query. For example, an operator in a query sent to a search engine may include instructions that cause the search engine to remove or exclude specific results from a response to a query. For example, a query may be one or more structured query language (SQL) commands and an operator may be one or more SQL commands added to the query.

For example, in accordance with the above "invoice" (search term or phrase) and "voicemail" (the potential cause for false positive), a NOTLIKE ("invoice", "voicemail") operator may be automatically generated and included in a search query such that the query will find and return interactions that include the word "invoice" but will not include, in its response, interactions that do not include the word "invoice" and do include the word "voicemail".

As described, in some embodiments, for each phonetic search result, every ASR search result that matches in time is included in a list. An ASR search result may be considered a temporal match if the two results (phonetic result and ASR result) have the same file ID, the phonetic result's start time is less than the ASR results end time, and the phonetic result's end time is equal to, or greater than the ASR result's start time. In some embodiments, only phrase results with strong overlaps.

In some embodiments, a list of phrases may include, for each phrase, an identification of file or other object that includes the phrase, an offset of the phrase in the object and a length of the phrase, and marking a phrase as a potential cause for a phrase search false positive may include at least one of: verifying a reference to the phrase in the list produced by the phonetic search and a reference to a phrase identified by the ASR are related to, or reference or point to, the same file, and verifying, based on an offset and a time length in the list, that an overlap of a phrase referenced in the list produced by the phonetic search with a phrase identified by the ASR is equal to, or above a threshold. For example, only phrases found using ASR and phonetic search and with a strong time or offset overlap may be included in a list as described.

As described, in some embodiments, a phrase may be marked as, or included in a list of, potential or possible cause for a phrase search false positive if for example the confidence score value associated with the phrase is equal to, or above a threshold. For example, a list of potential cause for a phrase search false positive with respect to the word "computer" may include the words "computers" and "commuter" but, although the words "complicated" and "complain" were found by a phonetic search as described (e.g., with reference to FIG. 3), the words, "complicated" and "complain" may be excluded from the list or group of potential causes for a phrase search false positive since their confidence score is less than a threshold of 0.83. If the confidence score value associated with an examined phrase is below a threshold then an embodiment may proceed to examine additional phrases, e.g., in a list of potential causes phrase search false positives.

A list of potential cause for a phrase search false positive (e.g., updated phrase result group (481) shown in FIG. 4A) may be presented to a user. For example, the list may be sorted, in descending order according to the number of occurrences of the phrases.

Reference is made to FIG. 7 that shows an example of presentation of information to a user. As shown by screenshot 701 in FIG. 7, an embodiment may enable a user to select phrases to be included in an operator for a query. For example, as shown by block 710, a set of phrases may be presented to a user, and, for each phrase, statistics such as, number of hits or occurrences (e.g., times the phrase was found), PCT, first 30, last 30 and so on may be presented.

For example, in a screen displayed to a user as shown by screenshot 701, the "Files Hit" column may include the number of files where a search phrase occurs in ASR at least once, "Pct" may be the percentage of files where a search phrase occurs in ASR at least once, "First 30" may be the total number of files where the search phrase occurs in ASR at least once in the first 30 seconds, "First 120" may be the total number of files where the search phrase occurs in ASR at least once in the first 120 seconds, "Last 30" may be the total number of files where the search phrase occurs in ASR at least once in the first 30 seconds, "Last 120" may be the total number of files where the search phrase occurs in ASR at least once in the first 120 seconds and "Status" may be a user editable field for receiving input from a user, e.g., a selection whether to treat phrase as equivalent or as an imposter that should be filtered out as shown.

As further shown, a status for each phrase may indicate whether or not the phrase is included in a NOTLIKE operator as described. As shown by buttons 720, a user may select to filter out a phrase, and, based on a selection to filter out, the phrase may be included in a NOTLIKE operator such that a query will ignore files or objects that include the filtered-out phrase as described. Accordingly, an embodiment may automatically generate a NOTLIKE operator based on a selection of a user. Selecting (e.g., clicking the button) "treat as equivalent" may cause an embodiment to treat a phrase (e.g., the one highlighted in block 710) as a phrase that is equivalent to the search phrase, e.g., an embodiment may not add an operator to a query for the search phrase, e.g., leave the query unmodified. For example, if a word that is different from an original or input search term or word (e.g., different from search phrase 230) has the same meaning or is related to the same business logic, it may be advantageous and/or desirable to search for the word when searching for the original or input search term or word. By selecting "treat as equivalent", a user may cause an embodiment to include a word, e.g., highlighted as shown by block 710, in results when searching for an original or input search term or word. Selecting the "Add to clipboard" button in buttons 720 may cause an embodiment to include the phrase in buffer or other storage, e.g., in order to present it to the user at later time or stage when further processing may be done. As shown, a presentation of information to a user in an interactive screen may include a "Filter all out" button that may cause an embodiment to create a NOTLIKE operator for all the phrases in block 720. For example, based on user input provided by a click on the "Filter all out" in the case when, for a search phrase "computer", the phrases "commuter", "confused" and "complicated" are shown in block 710, an embodiment may create and/or include in a search query a NOTLIKE ("computer", "commuter", "confused" and "complicated") operator that may cause a query for searching the phrase "computer" to exclude the phrases "commuter", "confused" and "complicated" from the search.

Accordingly, an embodiment may identify potential cause for a phrase search false positive by producing automatic speech recognition (ASR) results by searching for a first phrase in a set of objects using ASR (e.g., produce ASR results 210); producing phonetic search results by searching for the first phrase in the set of objects using phonetic search (e.g., produce phonetic search results 220); and if a mismatch between a phrase included in the phonetic search results and a phrase included in the ASR results is found then marking the phrase as a potential cause for a phrase search false positive. If no mismatch is found then an embodiment may proceed to examine additional phrases, e.g., in a list of phrases.

Generally, an embodiment may identify and/or determine a mismatch between two phrases if the phrases are not the same or are identical and/or if the phrases are only partially different. For example, an embodiment may identify or determine that the two phrases "walk" and "walk" match and the embodiment may identify or determine that the two phrases "walk" and "walking" do not match. Finding a mismatch between phrases as described herein may include identifying or determining a mismatch as described herein.

For example, PIQG 205 may assume (e.g., includes logic that) ASR results are correct, e.g., accurately find search phrase 230, and PIQG 205 may further assume that phonetic search results 220 are putative, accordingly, some phrases included in phonetic search results 220 may be marked, treated and used as causes for false positives.

Embodiments of the invention may improve various technologies, e.g., technologies related to searching for phrases in media. By comparing ASR results and phonetic search results and generating a list of potential causes for false positives as described, embodiments of the invention may improve any system or method that uses queries, e.g., by automatically generating queries that exclude potential causes for false positives from a result or response of a query.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method identifying potential cause for a phrase search false positive when searching audio interaction objects, the method comprising:
    using a processor conducting automatic speech recognition (ASR) to search for a first phrase in a set of objects to produce ASR results comprising identification of one or more objects identified by ASR as including the first phrase;
    producing using the processor a list of phonetic references comprising references to one or more objects identified by phonetic search as including the first phrase by searching for the first phrase in the set of objects using phonetic search;
    at the processor using output produced by the ASR to determine, using a phrase identification and query generation unit, whether or not a reference in the list of phonetic references points to a phrase that is the same as the first phrase;
    if it is determined that the reference points to a second phrase that is different from the first phrase then marking by the processor the second phrase as a potential cause for the phrase search false positive;
    displaying a list of potential causes for the phrase search false positive with respect to the first phrase to a user;
    accepting an input from the user, the input comprising a potential cause for the phrase search false positive from the display; and
    based on the input creating an operator designed to cause a query for searching the first phrase to omit the potential cause for the phrase search false positive in the input from a response of the query.

2. The method of claim 1 wherein the list of phonetic references includes, for each phrase, an identification of an object that includes the phrase, an offset of the phrase in the object and a time length of the phrase, and wherein marking the second phrase as a potential cause for a phrase search false positive includes at least one of:
    verifying a reference to the phrase in the list of phonetic references and a reference to a phrase identified by the ASR reference to the same object, and
    verifying, based on an offset and a time length in the list of phonetic references, that an overlap of a phrase referenced in the list of phonetic references with a phrase identified by the ASR is above a threshold.

3. The method of claim 1 wherein the list of phonetic references includes, for each referenced phrase, a confidence score value and wherein the second phrase is marked as a potential cause for a phrase search false positive if the confidence score value of the second phrase is above a threshold.

4. The method of claim 3 comprising:
    if the confidence score value of the second phrase is above the threshold then including the second phrase in a set of confusable phrases.

5. The method of claim 4 wherein:
    if the number of references in the list of phonetic references is below a predefined value then setting the value of the threshold to a predefined threshold value; and
    if the number of references in the list of phonetic references is above the predefined value then setting the value of the threshold based on the lowest confidence score value.

6. The method of claim 4 comprising removing a phrase from the set of confusable phrases based on a match level of the phrase with the first phrase.

7. The method of claim 4 comprising removing a phrase from the set of confusable phrases based at least one of: the number of references to the phrase in the list of phonetic references and a presence of stop words in the phrase.

8. A method identifying potential cause for a phrase search false positive when searching audio interaction objects, the method comprising:
    producing using a processor automatic speech recognition (ASR) results by searching for a first phrase in a set of objects using ASR, the ASR results comprising identification of one or more objects identified by ASR as including the first phrase;
    producing using the processor phonetic search results by searching for the first phrase in the set of objects using phonetic search, the phonetic search results comprising references to one or more objects identified as including the first phrase;
    if a mismatch between a phrase included in the phonetic search results and a phrase included in the ASR results is found then marking the phrase included in the phonetic search as the potential cause for a phrase search false positive;
    displaying a list of potential causes for the phrase search false positive with respect to the first phrase to a user;
    accepting an input from the user, the input comprising a potential cause for the phrase search false positive from the display; and
    based on the input creating an operator designed to cause a query for searching the first phrase to omit the potential cause for the phrase search false positive in the input from a response of the query.

9. The method of claim 8 comprising generating a search query based on the potential cause for a phrase search false positive.

10. The method of claim 8 comprising marking the phrase as a potential cause for a phrase search false positive if a confidence score value of the phrase included in the phonetic search results is above a threshold.

11. The method of claim 10 comprising:
    if the confidence score value of the second phrase is above the threshold then including the second phrase in a set of confusable phrases.

12. A system comprising:
    a memory; and
    a controller to:
        use automatic speech recognition (ASR) to search for a first phrase in a set of objects to produce ASR results comprising identification of one or more objects identified by ASR as including the first phrase;
        produce a list of references by searching for the first phrase in the set of objects using phonetic search;

use output produced by the ASR to determine whether or not a reference in the list of references points to a phrase that is the same as the first phrase, if it is determined that the reference points to a second phrase that is different from the first phrase then marking the second phrase as a potential cause for a phrase search false positive;

displaying a list of potential causes for the phrase search false positive with respect to the first phrase to a user;

accepting an input from the user, the input comprising a potential cause for the phrase search false positive from the display; and based on the input creating an operator designed to cause a query for searching the first phrase to omit the potential cause for the phrase search false positive in the input from a response of the query.

13. The system of claim 12 wherein the list of references includes, for each phrase, an identification of an object that includes the phrase, an offset of the phrase in the object and a time length of the phrase, and wherein marking the second phrase as the potential cause for a phrase search false positive includes at least one of:

verifying a reference to the phrase in the list of references and a reference to a phrase identified by the ASR are related to the same object, and verifying, based on an offset and a time length in the list of references, that an overlap of a phrase referenced in the list of references with a phrase identified by the ASR is above a threshold.

14. The system of claim 12 wherein the list of references includes, for each referenced phrase, a confidence score value and wherein the second phrase is marked as a potential cause for a phrase search false positive if the confidence score value for the second phrase is above a threshold.

15. The system of claim 14 wherein the controller is configured to:

if the confidence score value of the second phrase is above the threshold then include the second phrase in a set of confusable phrases.

16. The system of claim 15 wherein the controller is configured to:

if the number of references in the list of references is below a predefined value then setting the value of the threshold to a predefined threshold value; and if the number of references in the list of references is above the predefined value then setting the value of the threshold based on the lowest confidence score value.

17. The system of claim 15 wherein the controller is configured to remove a phrase from the set of confusable phrases based on a match level of the phrase with the first phrase.

18. The system of claim 15 wherein the controller is configured to remove a phrase from the set of confusable phrases based at least one of: the number of references to the phrase in the list of references and a presence of stop words in the phrase.

* * * * *